US011949301B2

United States Patent
Serafica

(10) Patent No.: US 11,949,301 B2
(45) Date of Patent: Apr. 2, 2024

(54) HYBRID ELECTRIC FUEL CELL POWER PLANT

(71) Applicant: Rogelio Timbol Serafica, Makati (PH)

(72) Inventor: Rogelio Timbol Serafica, Makati (PH)

(73) Assignee: ROGELIO TIMBOL SERAFICA, Makati (PH)

( * ) Notice: Subject to any disclaimer, the term of this patent is extended or adjusted under 35 U.S.C. 154(b) by 0 days.

(21) Appl. No.: 17/817,379

(22) Filed: Aug. 4, 2022

(65) Prior Publication Data

US 2022/0399740 A1    Dec. 15, 2022

(51) Int. Cl.
- *H02K 21/00* (2006.01)
- *H02J 3/38* (2006.01)
- *H02J 7/02* (2016.01)

(52) U.S. Cl.
CPC .............. *H02K 21/00* (2013.01); *H02J 3/381* (2013.01); *H02J 7/02* (2013.01)

(58) Field of Classification Search
CPC ..................................................... H02K 21/00
See application file for complete search history.

(56) References Cited

U.S. PATENT DOCUMENTS

| | | | | |
|---|---|---|---|---|
| 3,886,545 A | * | 5/1975 | Skrobisch | G09F 9/375 340/815.86 |
| 2002/0030364 A1 | * | 3/2002 | Bosley | F04B 47/022 290/7 |
| 2010/0248561 A1 | * | 9/2010 | Daikoku | B63J 3/02 903/905 |
| 2020/0021236 A1 | * | 1/2020 | Pan | H02J 3/381 |
| 2020/0247247 A1 | * | 8/2020 | Upward | B60L 53/24 |
| 2020/0326306 A1 | * | 10/2020 | Gunawan | G01N 27/72 |
| 2021/0078148 A1 | * | 3/2021 | Seith | B25B 23/18 |
| 2021/0242686 A1 | * | 8/2021 | Petersen | H02J 3/32 |

* cited by examiner

Primary Examiner — Adi Amrany

(57) ABSTRACT

A process, system or method of multiple permanent magnet motor generators chained together through a rotating magnetic field powered primarily by rechargeable battery system. A permanent magnet motor generator prime mover will initiate the rotations of the individual permanent magnet motor generator positioned in parallel with each other in a magnetic field gap to form a rotating magnetic field chain and generate a much higher electricity output wattage. In another embodiment is a series of induction and or synchronous independently generators power plant powered by a combination of wind, solar, alternator and AC outlet battery chargers. Both embodiments use a multisource power system to charge batteries coming from wind, solar, alternators and AC grid outlet. The process produces a safe, cheap and zero carbon emission footprint at reduced cost for power plants and other industrial applications.

1 Claim, 2 Drawing Sheets

HYBRID ELECTRIC FUEL CELL POWER PLANT

BACKGROUND OF THE INVENTION

One of mankind's biggest discovery and invention is electricity generated artificially from a dynamo which we now call motor generating electricity. Mankind was greatly benefited and owed so much to this single energy source creating a modern civilization on present day that we now enjoy.

Except perhaps for batteries, almost all energy power sources such as fossil fuel, steam, nuclear, hydro and wind would ultimately need a motor generator to induce and generate the much sought after electrical current from the movements of the motor generator.

All prime movers' energy sources have different utility capital and operational cost to operate. Examples are crude oil and natural gas to power an internal combustion engine (ICE). A dam that requires constant monitoring and maintenance and harness the water valued for irrigation, household and industrial use. Traditional prime movers of generators are from fossil fuel, nuclear, biomass, hydro, steam and geothermal and the latest are called renewables like wind and solar or photovoltaic cells, comes now a hybrid electric cell power plant joining the ranks of clean energy.

Due to the destructive effect of global warming which is a real serious threat to mankind and possible extinction, thus, this embodiment is born out of necessity and self-preservation. As the world does not have the luxury of time it can no longer afford to wait for a clean, affordable, compact and easy set up power plants and it is a race to avert more destructions where we, mankind, the guardian of environment is on the run, thus, this embodiment a magnetic field fuel cell hybrid power plant is a possible answer and a solution in reducing the huge carbon footprint malaise and culprit that world now is on its midst. On another embodiment, a series of motor generators are powered by batteries.

SUMMARY OF THE INVENTION

The novel invention involves the usage of a starter permanent magnet motor generator preferably powered by a rechargeable battery and auxiliary batteries with its own battery management system (BMS). Batteries as power source and storage are charged from photovoltaic (PV), wind or self-generating alternators.

The permanent magnet generator prime mover of choice depends on geographic location and needs to produce a desired voltage output. As an example, is a permanent magnet motor generator a 50 Hz or 60 Hz and rated 1740 to 1750 revolution per minute (RPM) acts as a prime mover with no housing insulation for the external artificial magnetic field to flow, rotate and spin together synchronously rotate with the other permanent magnet motor generator adjoining parallel connected to each other closely for an external magnetic field contact and through the interaction or through the conversion of electromagnetic energy into rotating mechanical and electrical energy.

The motion produces an artificial rotating magnetic field that extends externally from its vector. In FIG. 1 the artificial magnetic field produces electric current field through its spin (rotor and stator). The external moving magnetic field from the prime mover interacts with the other permanent magnet motor generator positioned in parallel with other permanent magnet motor generator with a gap distance to connect with one individual magnetic field of influence from the nearest permanent magnet motor generator when the primary prime mover is initiated. This will cause excitation and move the adjoining permanent magnet motor generators through the external magnetic field synchronously with the prime mover.

The parallel level gap and distance connecting each magnetic field range generates electromagnetic connectivity. Both the prime mover and the adjoining permanent magnet motor generator would synchronously rotate and spin at almost the same angular velocity as the prime mover because of the interactive transfer of energy to the adjoining permanent magnet motor generator of the rotating individual magnetic field bereft of physical mechanical contact except from the rotating motion of the magnetic field within the range and distance of each magnetic field contact. The same movement and rotation shall be achieved in all of the other permanent magnet motor generators added beside each other to form a chaining reaction. Thus, would induce a multiplier effect of electricity output.

The connection between angular momentum and magnetic movement is the basis of rotation by magnetization. When the rotating magnetic field loop moves faster in the same direction the current and magnetic movement synchronously increases. The difference of magnetic forces as the general rule attraction and repulsion depending on the magnetic pose orientation creates a spin for the primary and a strong basis of this embodiment and the choice of a permanent magnetic motor generator unique in this design.

In another embodiment is a series of motor generators either an induction or synchronous motor generator linked to main control system panel powered by a large battery in tandem with a dedicated individual fuel cell battery for each motor generator as shown in FIG. 2. Rechargeable with multiple power sources such as solar (PV), wind, alternator generator and AC outlet.

The advantages of a hybrid power plant system in this embodiment are as follows: The cost of mobilization is inexpensive as almost the same cost as a thermal plant, no fossil fuel is used, consistent electrical output, sustainable and predictable long term power generation, independent and multiple power source, average capital equipment and operational cost, can withstand extreme temperatures, cost of power generation will be greatly reduced and finally the hybrid power plant in this embodiment will generate clean green and affordable energy,

DETAILED DESCRIPTION OF THE INVENTION

Figure 1:
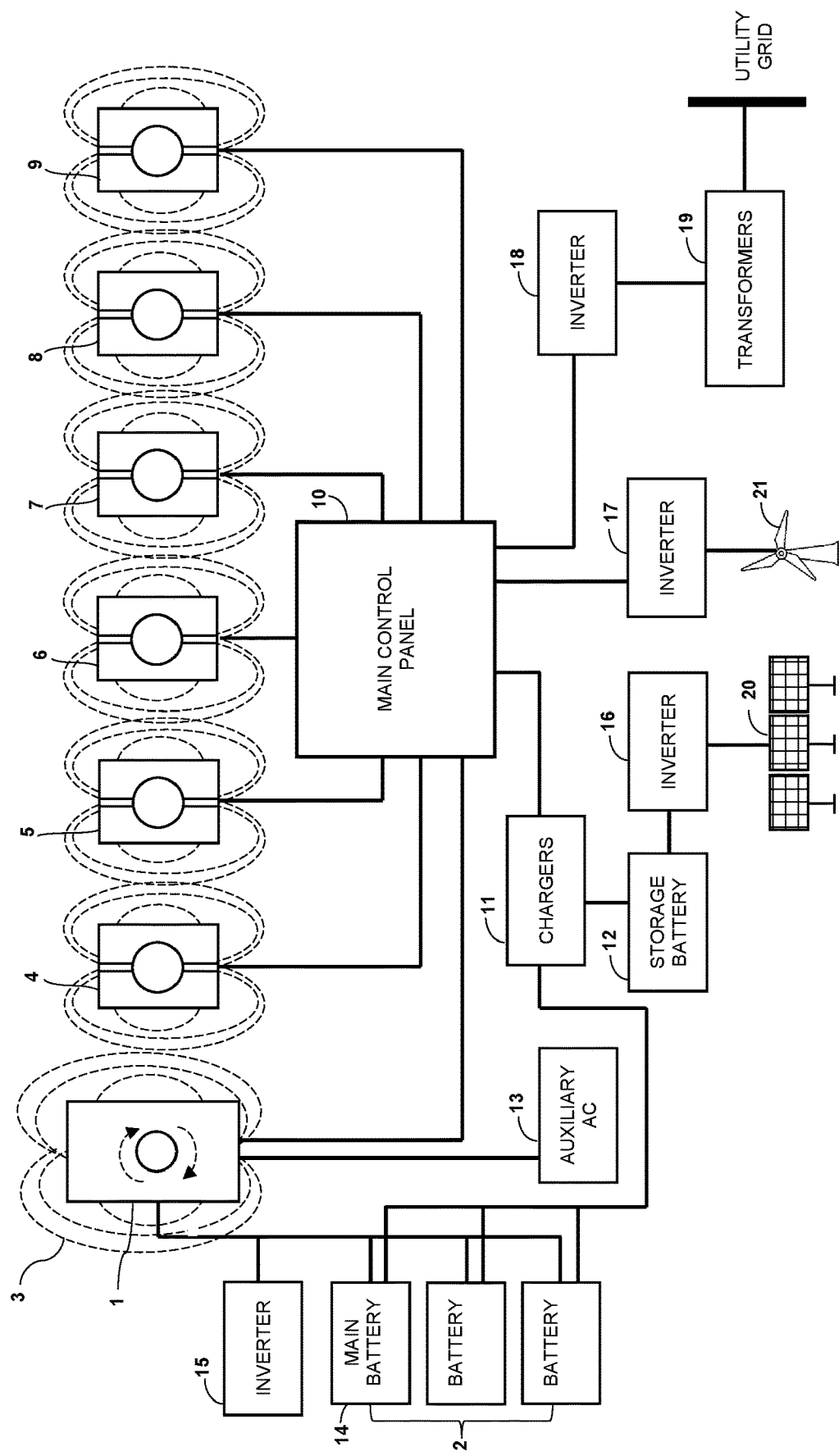
FIG. 1 shows the mechanism involved in the process of the permanent magnet behavior.

In FIG. 1, When the prime mover 1 is powered from rechargeable batteries 2, it will initiate the permanent magnetic motor generator to rotate such as in this case the rated RPM is 1740, the prime mover's electrical magnetic field rotates synchronously with the motor movement. An external magnetic field 3 range and influence beyond its housing is similarly generated due to the artificial magnetic field of several permanent magnet motor generators 4, 5, 6, 7, 8, 9 properly positioned at a gap or distance parallel to the prime mover 1, thus, would rotate and spin at almost similar angular velocity together with a torque synchronously at the same time and space. Due to the permanent magnet's interaction from within the permanent magnet motor generators 4, 5, 6, 7, 8, 9 coupled with the external magnetic field 3 sphere of influence rotational motion from the prime mover 1, a transfer of energy is thus initiated. There is an immediate recipient of the mechanical and electrical energy transfer to the nearest prime mover 1 and to the next. In effect, becoming another source of power and secondary prime mover. At this instance, the adjoining prime movers positioned in parallel to each other all act as secondary prime movers like a chain reaction or a chaining effect. All the permanent magnet motor generator within the chain and connected by way of each magnetic field range would rotate and spin synchronously until the primary prime mover is halted. The combined wattage output are computed based on the ratings of the permanent magnet motor generator connected to a main control panel 10 equipped with all monitoring system for velocity, RPM, voltage, temperature, switches and circuit breakers. Battery management control system is incorporated to monitor the battery life and condition. Battery chargers 11 and storage battery 12 are altogether in place when battery weakens at a low level. Back up auxiliary AC 13 batteries in case of damages and for alternate usage are on standby. The prime mover 1, main battery 14, auxiliary batteries, battery charger, several secondary motors, inverters 15, 16, 17, 18 and transformers 19 are all connected to the main or master control panel 10 equipped with automatic battery transfer switch, circuit breaker monitor, variable frequency drive (VFD) monitor, voltage regulator and voltage output monitor. Solar panels (PV) 20 and wind turbine 21 power sources are harnessed to charge batteries apart from the AC auxiliary and grid outlet.

Figure 2:
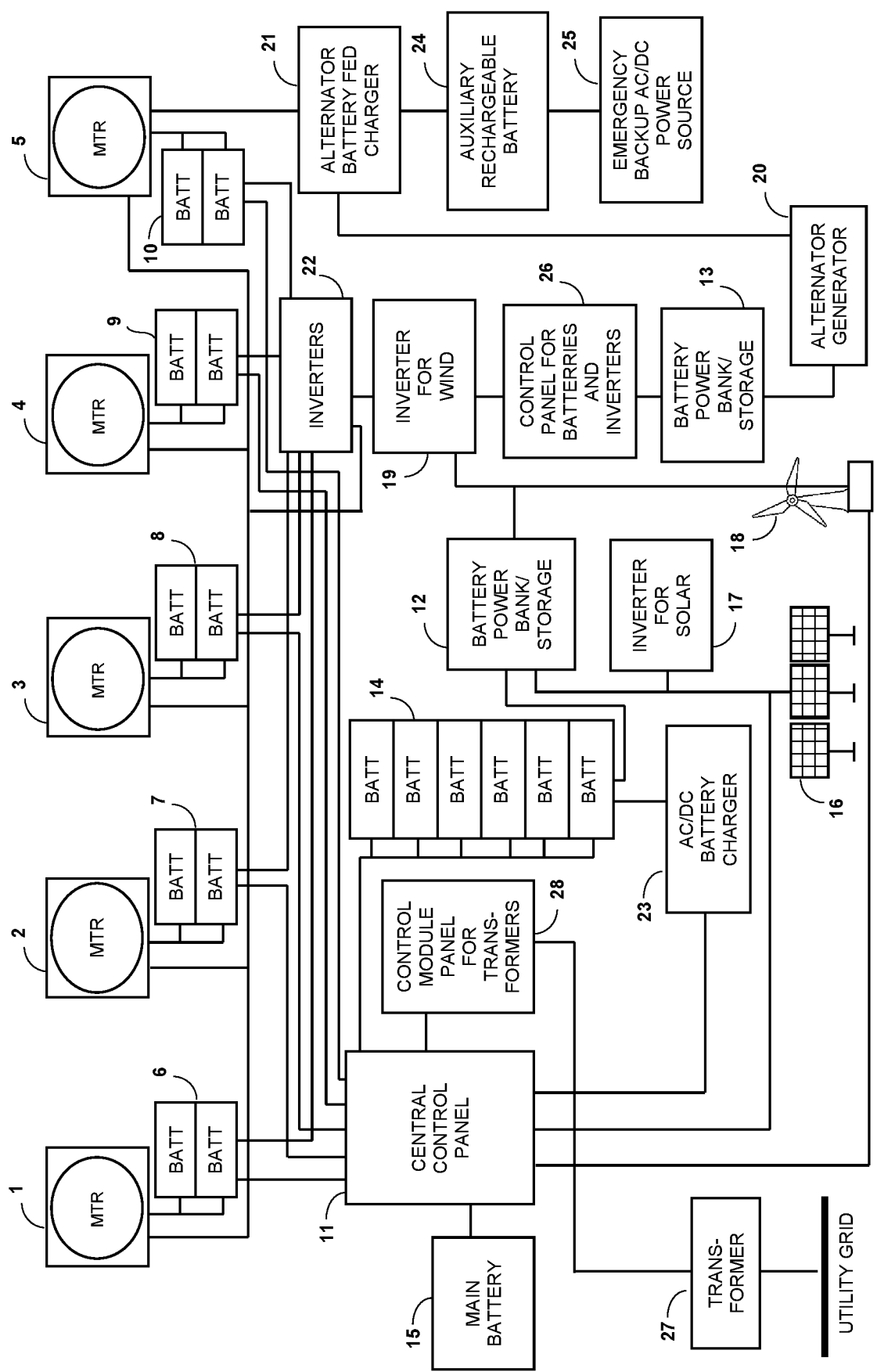
FIG. 2 shows a series of motor generators ideally an induction and or synchronous motor generator linked to main control system panel powered by a large battery in tandem with a dedicated individual fuel cell battery for each motor generator.

In another embodiment FIG. 2, the individual induction or synchronous motor generators 1, 2, 3, 4, 5 use two rechargeable batteries 6, 7, 8, 9, 10 for each induction or synchronous generator linked mainly on the central control panel 11. Two independent battery power banks or storage 12, 13 are on standby in case of weakened battery for each motor generation. A continuous charged batteries 14 insures any loss of power for each motor generator will be minimized if not eliminated by power banks on standby. All batteries including the main battery 15 will be charged from a solar (PV) 16 connected to an inverter 17, wind 18 connected to an inverter 19, AC outlet and or a self-charging alternator 20, independently battery fed 21. All motors are equipped with inverters 22 connected to the central control panel 11. An AC/DC battery charger 23 for versatility fast charging is provided to charge the main battery 15 to power the central control panel 11. Attached to an alternator 20 are auxiliary rechargeable battery 24 to the emergency backup AC/DC power source 25. A battery management system (BMS) 26 shall monitor the conditions of all the batteries except the main battery 15. Finally, a transformer 27 connected to the grid shall be monitored in a separate control module panel 28.

The invention claimed is:

1. A system for generating electrical energy, comprising:
   a) a rechargeable battery designed to provide power to the system;
   b) a prime motor generator, comprising of:
      i) a first permanent magnet which rotates when powered by the rechargeable battery;
   c) a plurality of secondary permanent magnet motor generators positioned in alignment with the prime motor generator, wherein:
      i) the nearest secondary permanent magnet motor generator is positioned within the magnetic field produced by the rotating first permanent magnet of the prime motor generator, and
      ii) each secondary permanent magnet motor generator is initiated to rotate in synchrony by the active moving magnetic field produced by the adjacent upstream permanent magnet motor generator creating chain reaction;
   this system, when initiated, forms a chain reaction mechanism, increasing the overall electrical energy output for use in a power plant or other industrial applications.

\* \* \* \* \*